United States Patent [19]

Spurr

[11] 4,313,720
[45] Feb. 2, 1982

[54] PARISON TRANSFER MEANS

[75] Inventor: Robert Spurr, West Hartford, Conn.

[73] Assignee: Emhart Industries, Inc., Farmington, Conn.

[21] Appl. No.: 126,834

[22] Filed: Mar. 3, 1980

[51] Int. Cl.³ ............................................. B29C 17/07
[52] U.S. Cl. .................................... 425/526; 264/535; 425/534; 425/539; 425/540
[58] Field of Search ............... 425/526, 534, 539, 540, 425/533; 264/535, 537, 538

[56] References Cited

U.S. PATENT DOCUMENTS

| | | | |
|---|---|---|---|
| 3,149,373 | 9/1964 | Marzillier | 425/526 |
| 3,324,507 | 6/1967 | Arlo | 425/526 |
| 3,507,005 | 4/1970 | Wiley et al. | 425/534 X |
| 3,611,484 | 10/1971 | Lecluyse et al. | 425/526 |
| 3,880,301 | 4/1975 | Reilly | 425/526 X |
| 4,050,887 | 9/1977 | Berggren et al. | 264/535 X |
| 4,116,609 | 9/1978 | Obsomer et al. | 425/526 |
| 4,140,464 | 2/1979 | Spurr et al. | 425/534 X |

Primary Examiner—Jan H. Silbaugh
Attorney, Agent, or Firm—A. W. Breiner

[57] ABSTRACT

In a machine system for continuous formation of molecularly oriented plastic bottles by blowing heat-conditioned parisons comprising a plurality of parison-forming stations, i.e., sixteen (16); a plurality of blowing stations, but fewer in number than the number of parison-forming stations, i.e., six (6); and a storage area between the parison-forming and parison-blowing stations, improvements are described in the mechanisms for transferring hot parisons from the storage area to the blowing stations on a continuous basis.

7 Claims, 5 Drawing Figures

PARISON TRANSFER MEANS

This application is related to Spurr and Duga copending application Ser. No. 013,417 filed Feb. 21, 1979, and to U.S. Pat. No. 4,140,464, issued Feb. 20, 1979. The disclosures of the aforesaid application and patent are incorporated into this application by reference.

FIELD OF INVENTION AND BACKGROUND

This invention is directed to a method and apparatus for molding a plastic bottle based on the hot-blow or one-step technique for manufacture of molecularly-oriented plastic bottles. More particularly, it is directed to improvements in a hot-blow or one-step machine system for the manufacture of plastic bottles comprising a given number of parison-forming stations, i.e., sixteen (16); a given but lesser number of blowing stations, i.e., six (6); and a storage area between the parison-forming and parison-blowing stations, permitting a high degree of parison mold and blow mold utilization and overall efficiency; and to the improved method of manufacture.

In recent years substantial effort has been directed to the formation of molecularly-oriented plastic bottles as a replacement, or partial replacement, for glass bottles. According to the prior art, the manufacture of molecularly-oriented bottles have utilized either a reheat, the so-called two-stage, process and system or a hot-blow, the so-called one-stage, process and system. In the reheat or two-stage process, parisons are first injection molded in a parison mold, cooled to room temperature, and stored for subsequent blowing into the finished bottle in a blow-mold. At time of blowing, the parisons are reheated to the blowing temperature of the plastic prior to blowing. In the hot-blow or one-stage process and system, the parison is injection molded in a parison mold and, substantially immediately after formation, is transferred while at the blowing temperature to a blow mold where the parison is blown into the finished bottle.

Each of the above-noted systems and processes have advantages and disadvantages. In the reheat process and system, efficient and effective use can be made of both the parison forming and the blowing stations which need not be integrated. However, substantial thermal energy is lost during the total operation in that the parison, after formation, is cooled down during storage and then reheated at the time of blowing. Moreover, the parisons from storage must be fed to the blow station, duplicating handling. The hot-blow process and system eliminates heat loss and duplicate handling. However, the advantages of the hot-blow process and system are mitigated in that conventionally in order to have proper temperature conditioning of the parison at the blowing station, for each parison station there is a corresponding blowing station. Since the time required for parison formation, including temperature conditioning, is substantially longer than for parison blowing, i.e., approximately twenty seconds for parison formation versus five seconds for parison blowing for a polyethylene terephthalate (PET) bottle, the blowing stations are only inefficiently used.

As described in the aforesaid U.S. Pat. No. 4,140,464 and copending application Ser. No. 013,417, it is now recognized that there can be a substantial delay between parison formation and the blowing of the parison without detriment to the properties of the finished bottle. For example, tests have established that there is no significant change in tensile yield values for delays in blowing of the parison after parison formation of up to ninety seconds and longer; and, furthermore, that temperature distribution in the walls of the parison varies only slightly over substantial periods. Based in part on the aforesaid recognition, a process and machine system is described in the aforementioned U.S. Pat. No. 4,140,464 and in copending application Ser. No. 013,417 whereby the number of blow molds is lower than the number of parison or injection molds. A parison storage area is provided between the parison forming and blowing stations.

The present invention is directed to a modification in the earlier machine systems and in the process of operation. In accordance with the alternate design, the parisons are withdrawn from the storage area sequentially and continuously, and heat-conditioned sequentially and continuously, if required, and blown sequentially and continuously in blow molds fewer in number than the number of parison-forming stations. The machine system of the alternate design includes means for transferring the parisons from the parison storage area to a continuously moving conveyor system transporting the parisons through a heat-conditioning device having means to rotate the parisons during the heat-conditioning period, conveying the parisons to a rotary infeed mechanism and delivering the parison into a continuous rotary multi-station blow molding mechanism in which split blow molds actuate to encompass the received parison, engaging a stretch rod and blow head to stretch and blow the bottle. Upon completion of the blowing cycle, the bottle is removed from the blow mold by rotary take-out means, delivering the completed bottle to a discharge station. The modifications in accordance with this invention will be more fully apparent from the following drawing and detailed description of the invention and, as will be apparent, are primarily in the mechanisms for transferring the hot parison from the storage unit to the blow stations.

DETAILED DESCRIPTION AND DRAWING

In the drawing, which illustrates in detail a preferred embodiment and mode of operation, FIG. 1 is a plan view of a parison storage area; the transfer mechanism for transferring parisons from the storage unit to the blow stations, and the blow stations;

Figure 1:
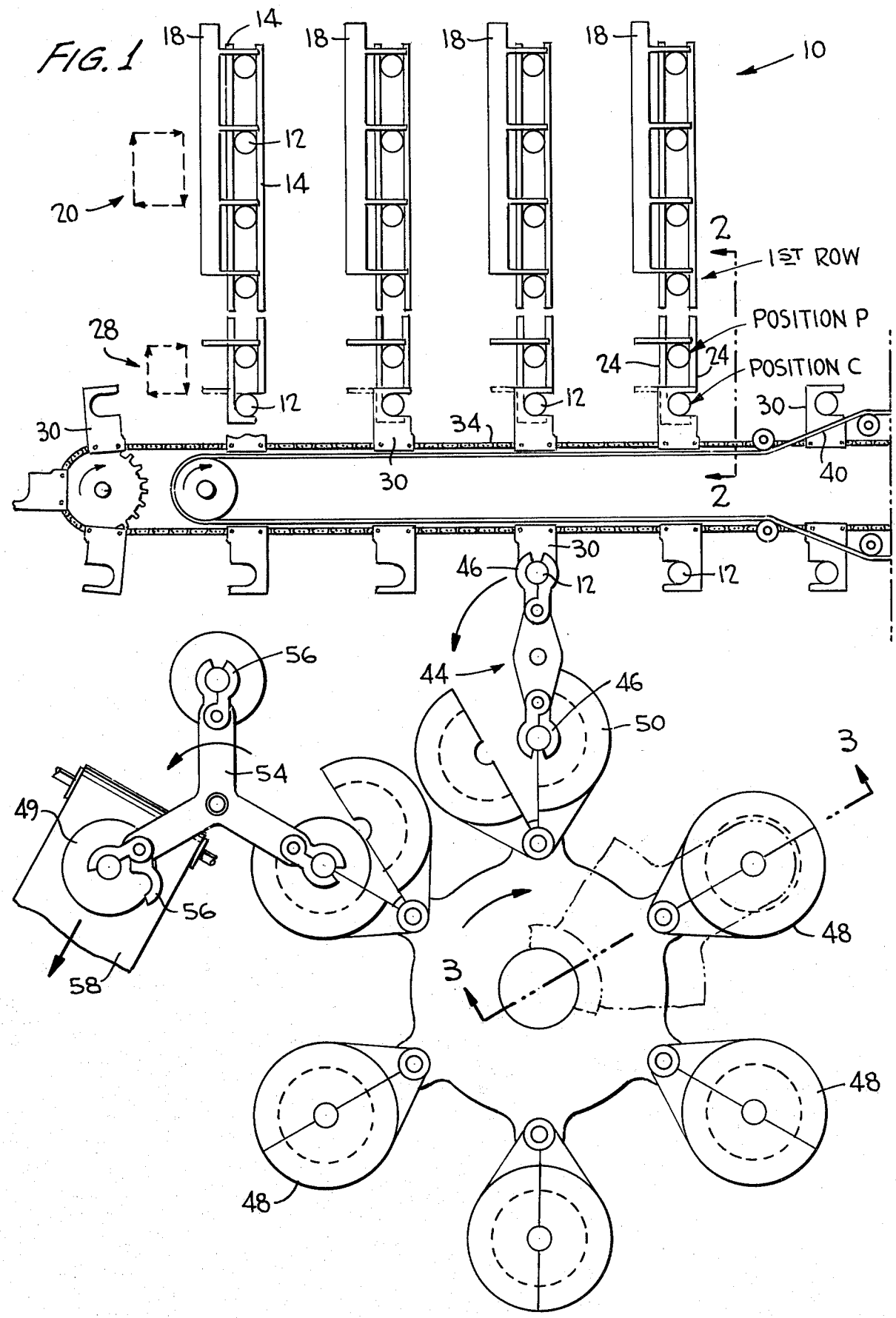
Figure 1:
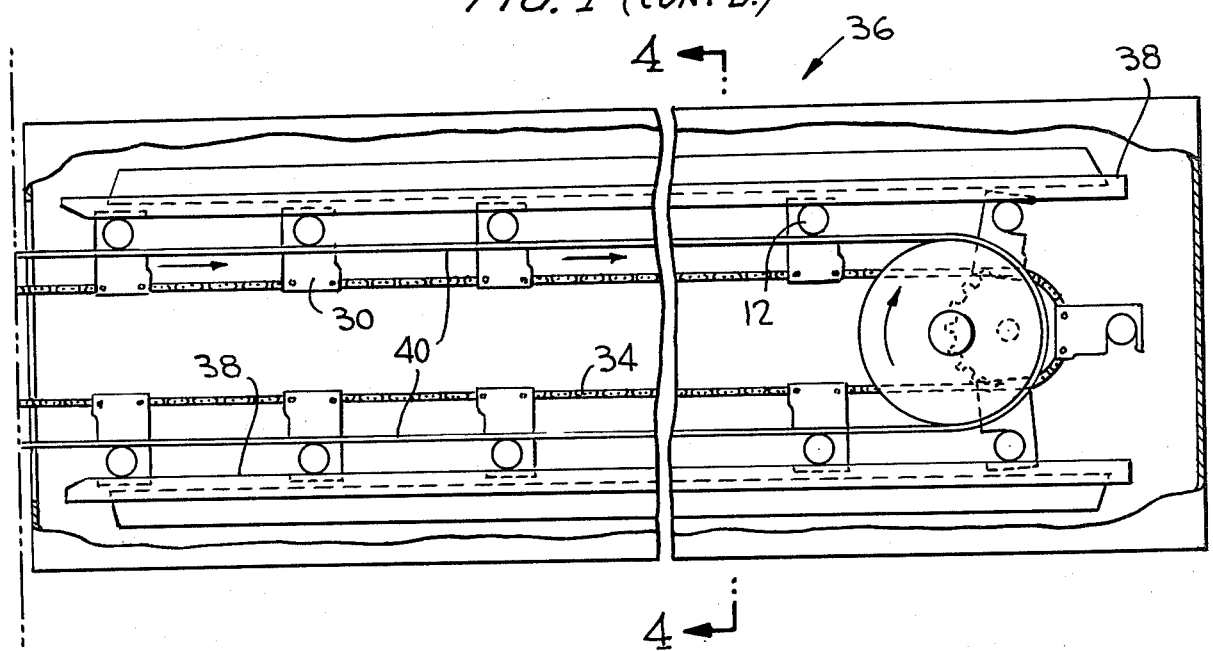

In the drawing, FIG. 1 illustrates in plan view a parison storage station 10 comprising movable rails 14 for receiving a plurality of parisons 12. Associated with the storage station is a shuttle transfer means 18 which moves in a rectilinear motion 20 to intermittently advance a multiple group of parisons by rows. The first row is advanced out of the control of movable rails 14 into the control of fixed guide rails 24 where the parisons of the first row assume a position P.

A pusher bar 26 which moves in rectilinear motion 28 then advances the parisons by rows from position P to position C. As shown in FIG. 1, when in position C the parisons 12 are free to move in a path at right angles to the path of rails 14 and 24, and parallel to chain conveyor 34. In position C the parisons are free to be picked off by parison carriers 30 driven by chain conveyor 34 for movement through a heat-conditioning chamber 36 and to a plurality (6) of rotating blow mold stations 48. At the rotating blow mold assembly, the parisons are individually and continuously picked off from carriers 30 by infeed transfer jaws 46 of infeed transfer 44 for transfer to individual split blow molds 50 for continuous blowing at the rotating blow mold stations.

Figure 2:
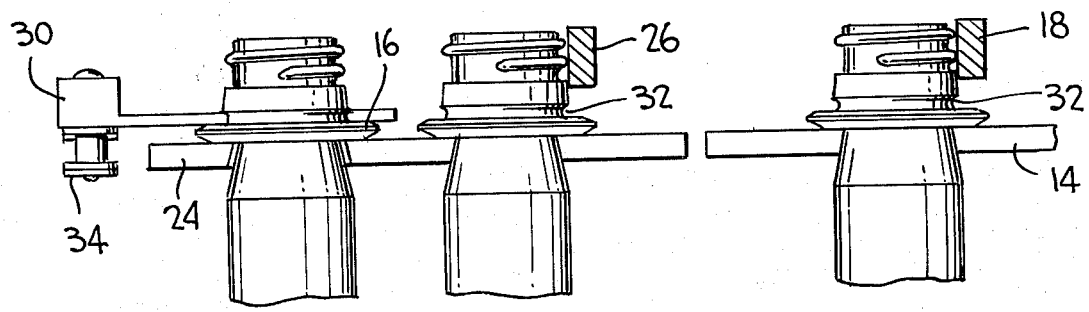
FIG. 2 is a cross-sectional view taken along lines 2—2 of FIG. 1 showing transfer of parisons from the storage area to the conveyor.

In operation of the machine system of the present invention, a plurality (16) of parisons are simultaneously made in a multi-parison forming machine system as described in U.S. Pat. No. 4,140,464 and in copending U.S. application Ser. No. 013,417. The parisons are transferred, again as described in U.S. Pat. No. 4,140,464 and in copending U.S. application Ser. No. 013,417, from the parison-forming stations to a storage area in a pattern configuration similar to that of the forming machine. As shown in FIG. 1 of the present application, the parisons 12 upon being transferred from the parison-forming station are lowered in a vertical neck-up position between pairs of movable mechanical actuating guide rails 14 which are spread apart to permit the parison body to freely enter. The rail pairs 14 are then moved together to support the parison under neck support flange 16, as best shown in FIG. 2. Shuttle transfer mechanism 18 actuated by drive means, not shown, through the described rectilinear motion 20 intermittently advances a multiple group of parisons by rows, to an intermediate station causing the first row of parisons to enter fixed guide rail pairs 24, advancing to position P. Multiple interconnected push bars 26 actuated in the described rectilinear motion 28 then advance the parisons to position C within the control of fixed guide rails 24 in timed relation with the continuously moving parison carriers 30 driven by chain conveyor 34. At this point the first row of four parisons at position C are transferred to an equal number of parison carriers 30, the parison carriers engaging the parison neck groove 32 above support flange 16, as best shown in FIG. 2.

After the parison chain conveyor has advanced four parisons, shuttle transfer 18 and pusher bar mechanism 26 will again intermittently and sequentially advance the groups of parisons by rows of four to the transfer point C, loading each of the parison carriers 30 sequentially. As an example and as shown in FIG. 1, each batch of sixteen parisons are loaded into the storage section 10 at a timed interval of X seconds and, accordingly, sixteen parison carriers 30 must receive the sixteen parisons within a time period of X seconds.

Figure 4:
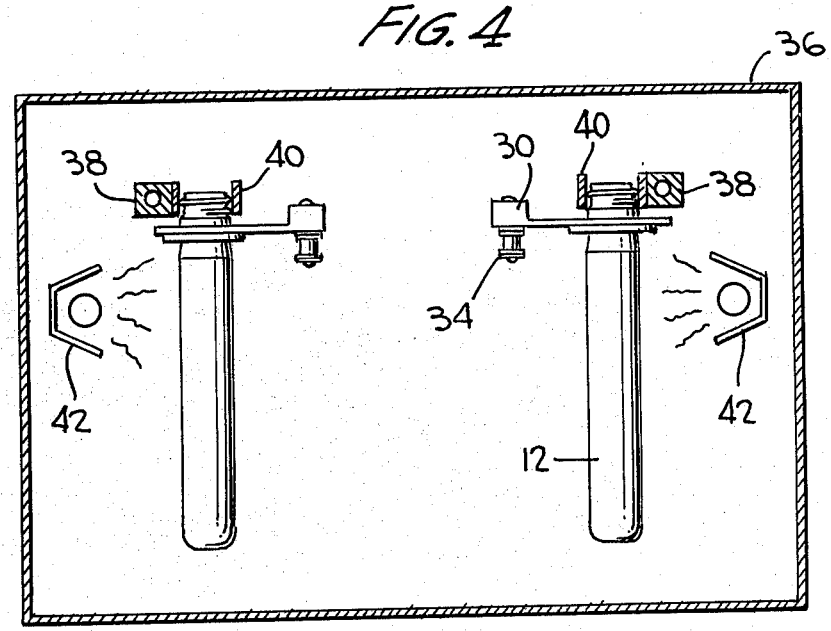
FIG. 4 is a cross-sectional view taken along lines 4—4 of FIG. 1 of a parison heat-conditioning device used during transfer.

The continuously moving parison carrier conveyor 34 conveys the parisons held by carriers 30 into a heat-conditioning chamber 36, bringing the parison neck into contact with a fixed rotator rail 38 with friction material thereon and fluid cooled, as best shown in FIG. 4. At this time a friction-faced rotary belt 40, traveling approximately twice the velocity of the parison conveyor 34, contacts the parison neck opposite the fixed rotator rail 38 causing the parison to rotate so that the parison is heated uniformly throughout by radiant heaters 42. As shown in FIG. 1, when the parisons leave heat-conditioning chamber 36, the parison rotation ceases.

After leaving the heat-conditioning chamber, the parison is conveyed by parison carrier 30 to infeed mechanism 44 where infeed transfer jaws 46 grasp the parison at the neck area, transferring the parison to one of the six blow mold stations 48 where the hinged and split blow mold 50 encloses the parison. Infeed transfer 44 rotates in counter-clockwise direction and the blow mold stations rotate in the clockwise direction. Infeed jaws 46 release the parison allowing the parison to continue travel with the mold.

Figure 3:
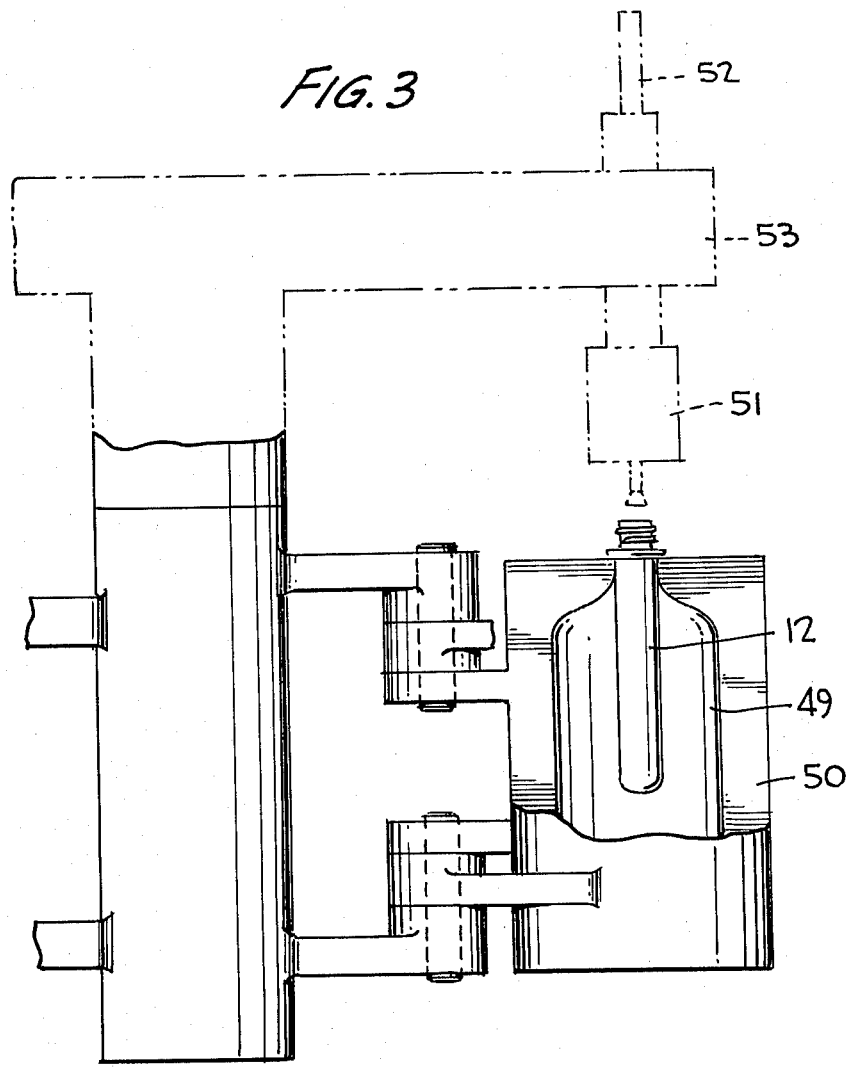
FIG. 3 is a cross-sectional view taken along lines 3—3 of FIG. 1 of a rotary blow mold station and showing additional detail of the blowing assembly in phantom lines.

As shown in phantom lines in FIG. 3, each of six rotary blow molds includes a blow head 51 and stretch rod assembly 52 mounted in the rotary head carrier 53 above each of the split blow molds 50. Immediately following the release of the parison by the infeed transfer jaws, the blow head lowers into contact with the parison during the rotation of the parison stations, initiating the stretch and blow operation which continues for approximately 180 degrees of rotation of the rotary blow mold mechanism. Following the blow air exhaust and lifting of the blow head and stretch rod, the rotating mold conveys the finished bottle 49 to the discharge transfer 54 where discharge transfer jaws 56 grasp the completed bottle 49 at its neck. At the same time the split blow mold 50 opens allowing the bottle 49 to be removed freely and transferred to a bottle discharge conveyor 58. The split blow mold is then in a position to receive an additional parison from a parison carrier 30, and the cycle is repeated.

Although the modified machine system has been described in reference to sixteen parison storage stations and six blow molds, the machine systems can be modified to accommodate varying numbers of parisons and varying numbers of parison blow stations, depending on the curing and other characteristics of the plastic materials used in forming the parisons. Additionally, the machine system and process as described includes a temperature-conditioning chamber. It at times, depending upon the plastic material, may not be necessary to include a heat-conditioning chamber, and/or the heat-conditioning chamber can be modified so as to heat only a portion of the parison, for example the neck and shoulder portions, without providing an additional heat or heat-conditioning to the parison body.

As will be apparent to one skilled in the art, various modifications can be made in the mechanisms as they relate to the shuttle transfer means, the parison carrier, the conveyor means, and to the blow mold assembly. The essential feature of the claimed invention is to a method of and apparatus for transferring hot parisons from an intermediate storage area to blow mold assemblies using a continuous or substantially continuous mode.

It is claimed:

1. In a machine system for manufacturing plastic bottles comprising a plurality of parison-forming stations, a plurality of blowing stations fewer in number than the number of parison-forming stations, a storage station for holding parisons formed at said parison-forming stations, and means for transferring parisons from said parison-forming stations to said storage station and from said storage station to said blowing stations; the improvement wherein the storage station includes support means for receiving a plurality of parisons X from said parison-forming stations, and the transfer means from said storage station to said blowing stations include shuttle means for sequentially transferring from said support means a plurality of parisons Y, which plurality is fewer in number than said plurality of parisons X to a station intermediate of said support means and said blowing stations, and conveyor means for simultaneously receiving said plurality of parisons Y from said intermediate station and continuously transferring said plurality of parisons Y individually and sequentially from said intermediate station to said blowing stations.

2. In the machine system of claim 1, the further improvement wherein said support means includes movable rails and means for moving said rails in and out relative to each other to receive said parisons when in the out position and hold said parisons when in the in position.

3. In the machine system of claim 2, the further improvement wherein said shuttle means includes a plurality of arm members for engaging said parisons when positioned in said support means and means for moving said arm members in unison in a rectilinear motion to advance a group of parisons Y in rows from said support means to an intermediate position.

4. In the machine system of claim 3, the further improvement wherein the said shuttle means further includes push bar members for engaging said parisons Y and means for driving said push bar members in unison in a second rectilinear motion for moving said plurality of parisons Y to said intermediate station.

5. In the machine system of claim 4, wherein said conveyor means for continuously transferring said parisons from said intermediate station to said blow station comprises parison carrier means carried by a continuous conveyor chain.

6. In the machine system of claim 1, the further improvement including a heat-conditioning chamber positioned between said intermediate station and said blow station to provide a parison temperature suitable for blowing, said conveyor means carrying said parisons through said chamber.

7. In the machine system of claim 1, the further improvement wherein the conveyor means for continuously transferring said parisons from said intermediate station to said blow stations comprises a continuously moving conveyor having parison carrier means thereon; the blow stations include means for rotating said blow stations, and infeed transfer means for transferring said parisons from said parison carrier to said rotating blow molds.

* * * * *